US012701314B1

(12) United States Patent
Jeong et al.

(10) Patent No.: US 12,701,314 B1
(45) Date of Patent: Aug. 4, 2026

(54) FLEX CIRCUIT ENABLING HIGH SPEED DATA TRANSFER FOR CAMERA WITH MOVEABLE IMAGE SENSOR

(71) Applicant: Apple Inc., Cupertino, CA (US)

(72) Inventors: Ho Seop Jeong, Palo Alto, CA (US);
Himesh Patel, Fremont, CA (US)

(73) Assignee: Apple Inc., Cupertino, CA (US)

( * ) Notice: Subject to any disclaimer, the term of this patent is extended or adjusted under 35 U.S.C. 154(b) by 576 days.

(21) Appl. No.: 17/810,285

(22) Filed: Jun. 30, 2022

(51) Int. Cl.
*H04N 23/57* (2023.01)
*H04N 23/54* (2023.01)

(52) U.S. Cl.
CPC ............. *H04N 23/57* (2023.01); *H04N 23/54* (2023.01)

(58) Field of Classification Search
CPC ............................... H04N 23/57; H04N 23/54
See application file for complete search history.

(56) References Cited

U.S. PATENT DOCUMENTS

| | | | |
|---|---|---|---|
| 11,516,394 B2 | 11/2022 | Johnson et al. | |
| 11,792,516 B1 | 10/2023 | Patel et al. | |
| 12,088,897 B1 | 9/2024 | Patel et al. | |
| 2020/0012068 A1* | 1/2020 | Lim ....................... | H05K 1/181 |
| 2020/0314338 A1* | 10/2020 | Johnson ................. | H04N 23/68 |
| 2021/0092297 A1* | 3/2021 | Smyth .................... | H05K 1/028 |
| 2022/0066123 A1* | 3/2022 | Chen .................. | H02K 41/0354 |

| | | | |
|---|---|---|---|
| 2022/0236583 A1 | 7/2022 | Eddington et al. | |
| 2022/0407256 A1* | 12/2022 | Wang ................... | H05K 1/0281 |
| 2023/0387773 A1* | 11/2023 | Lee ......................... | G03B 3/10 |
| 2024/0048835 A1* | 2/2024 | Kim ..................... | H04M 1/0277 |
| 2024/0214660 A1* | 6/2024 | Park ...................... | H04N 23/68 |
| 2024/0406560 A1 | 12/2024 | Peng et al. | |

FOREIGN PATENT DOCUMENTS

| | | | |
|---|---|---|---|
| CN | 214756610 | 11/2021 | |
| CN | 116088247 | 5/2023 | |
| CN | 114422681 | 6/2023 | |
| CN | 119108367 | 12/2024 | |
| TW | 201204188 A | * | 1/2012 |
| WO | 2024/027601 | 2/2024 | |

* cited by examiner

*Primary Examiner* — Sinh Tran
*Assistant Examiner* — Zhenzhen Wu
(74) *Attorney, Agent, or Firm* — Robert C. Kowert; Kowert, Hood, Munyon, Rankin & Goetzel, P.C.

(57) ABSTRACT

Embodiments include a dynamic flex circuit for use in a camera with a moveable image sensor. The dynamic flex circuit includes fixed end portion(s), a moveable end portion, and an intermediate portion. In some embodiments, the fixed end portion may be connected to another flex circuit of the camera. The moveable end portion may be coupled with the moveable image sensor. The intermediate portion may be configured to allow the moveable end portion to move with the moveable image sensor. Some embodiments include a plurality of layers including a first conductive layer for routing the electrical signals, a second conductive layer, and an insulation layer positioned between the first conductive layer and the second conductive layer. In some instances, flexure arms extend along a first flex region and a second flex region for movement of the first flex region relative to the second flex region based on stiffness.

14 Claims, 9 Drawing Sheets

Camera 200

Stationary Structure 208

210 Base Structure

Substrate 206

Moveable Image Sensor 204

End Portion 114(a)

Dynamic Flex Circuit 202

Third Straight Region 120(c)

Intermediate Portion 118

Second Straight Region 120(b)

First Straight Region 120(a)

Fourth Straight Region 120(d)

End Portion 114(b)

Dynamic Flex Circuit
300

Third Bent
Region
320

Second Set of Arms
328

Second Flex
Region
304

322
First Reinforcement
Material

Third Reinforcement
Material 336

310
First Bent
Region

First Set of Arms
326

Third Set of Arms
330

302
First Flex
Region

Third Flex
Region 306

Fifth Set of Arms
334

First Fixed End
Portion
314(a)

Second Bent
Region
312

Intermediate
Portion
318

308
Fourth Flex
Region

Movable End
Portion
316

324
Second
Reinforcement
Material

332
Fourth Set of
Arms

314(b)
Second Fixed
End Portion

338
Electrical Connection
Region

FIG. 3

First Flex Region
302

Cover Layer
402

First Conductive
Layer 404

Insulation Layer
406

Second Conductive
Layer 408

Base Substrate
410

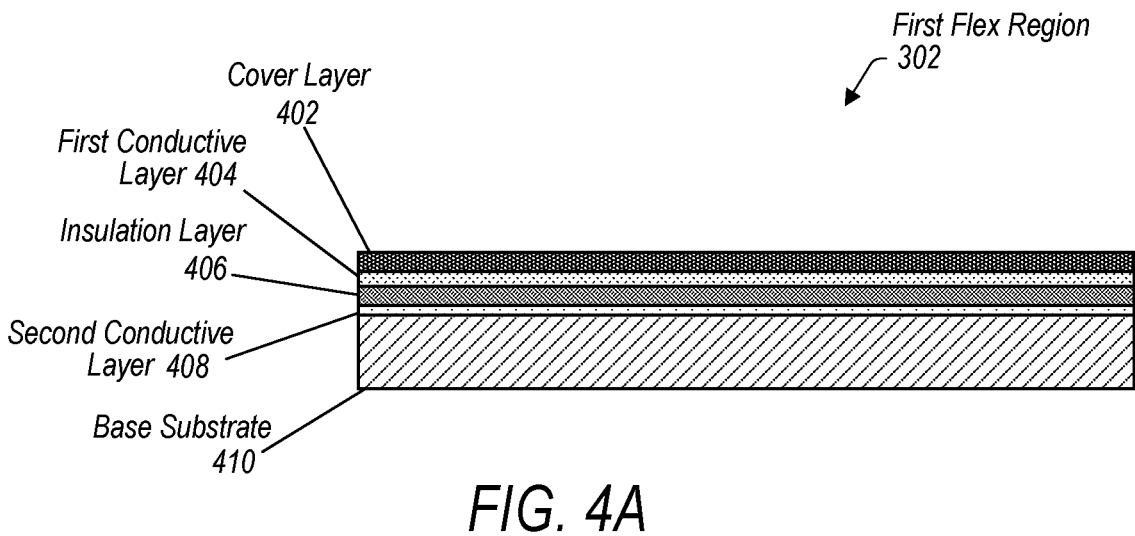

*FIG. 4A*

First Reinforcement
Material  322

First Bent Region
310

Cover Layer
402

First Conductive
Layer  404

Insulation Layer
406

Second Conductive
Layer  408

Base Substrate
410

Removed Region
412

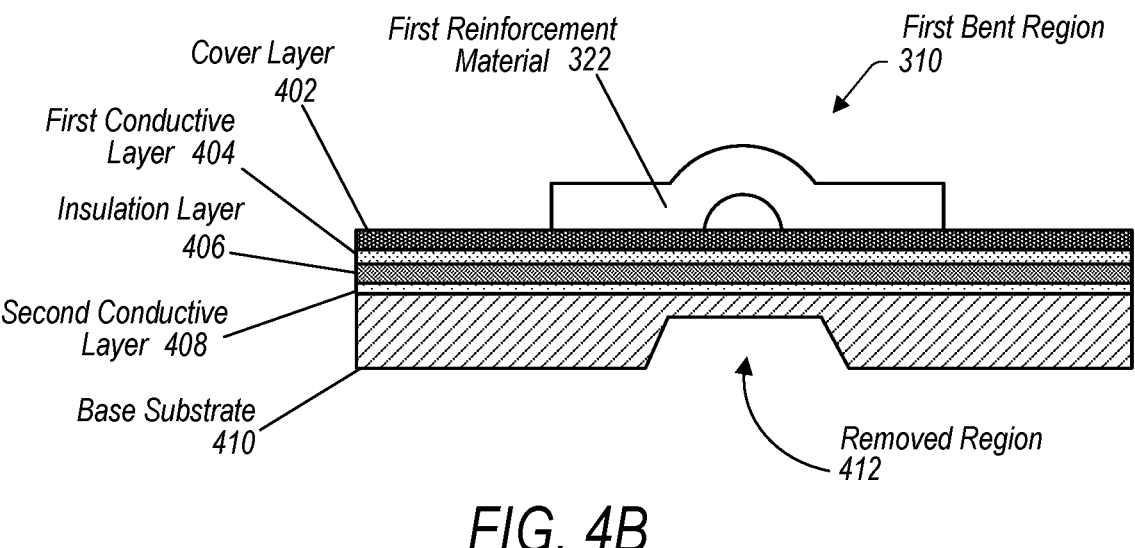

*FIG. 4B*

Cover Layer
402

First Conductive
Layer 404

Insulation Layer
406

Second Conductive
Layer 408

Electrical Connection Region
338

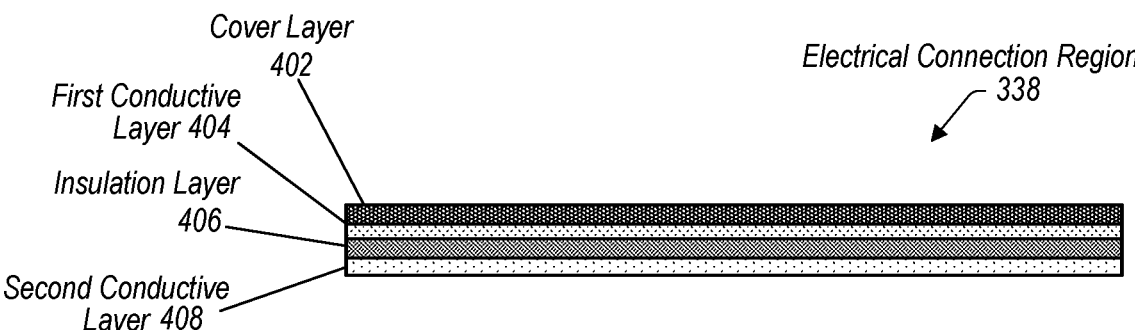

*FIG. 4C*

Baffle
602

Camera
600

Lens holder
604

Optics Holder
608

Light Folding
Element Holder
606

Stationary Structure
208

Substrate
206

Dynamic Flex Circuit
300

204
Moveable Image
Sensor

Base Structure
210

Figure 7:
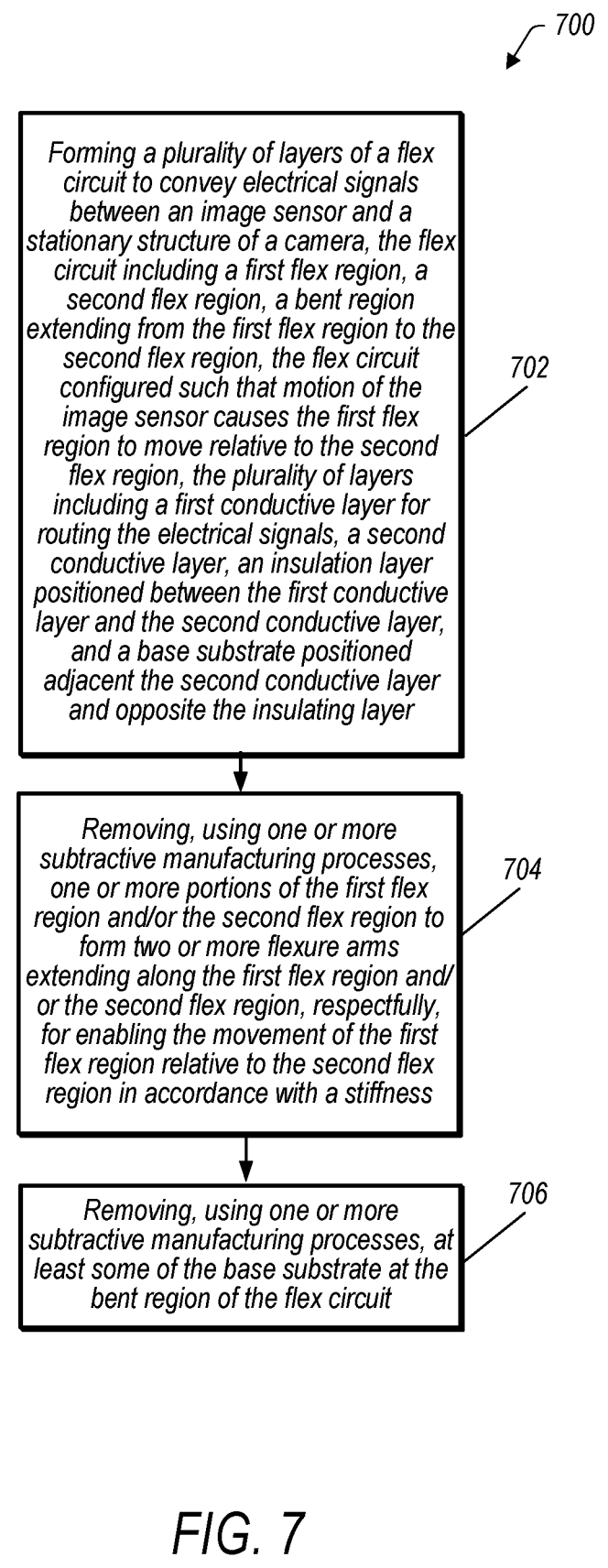

700

*Forming a plurality of layers of a flex circuit to convey electrical signals between an image sensor and a stationary structure of a camera, the flex circuit including a first flex region, a second flex region, a bent region extending from the first flex region to the second flex region, the flex circuit configured such that motion of the image sensor causes the first flex region to move relative to the second flex region, the plurality of layers including a first conductive layer for routing the electrical signals, a second conductive layer, an insulation layer positioned between the first conductive layer and the second conductive layer, and a base substrate positioned adjacent the second conductive layer and opposite the insulating layer*

702

*Removing, using one or more subtractive manufacturing processes, one or more portions of the first flex region and/or the second flex region to form two or more flexure arms extending along the first flex region and/ or the second flex region, respectfully, for enabling the movement of the first flex region relative to the second flex region in accordance with a stiffness*

704

*Removing, using one or more subtractive manufacturing processes, at least some of the base substrate at the bent region of the flex circuit*

FLEX CIRCUIT ENABLING HIGH SPEED DATA TRANSFER FOR CAMERA WITH MOVEABLE IMAGE SENSOR

BACKGROUND

Technical Field

This disclosure relates generally to flex circuit enabling high speed data transfer for a camera with a moveable image sensor.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

BRIEF DESCRIPTION OF THE DRAWINGS

FIG. 3 illustrates a perspective views of an example dynamic flex circuit for a camera with a moveable image sensor, in accordance with some embodiments.

FIGS. 4A, 4B, and 4C illustrate a cross-sectional views of example regions of a dynamic flex circuit for a camera with a moveable image sensor, in accordance with some embodiments. FIG. 4A illustrates an example of the dynamic flex circuit at a flex region.

FIG. 4B illustrates an example of the dynamic flex circuit at a bent region. FIG. 4C illustrates an example of the dynamic flex circuit at an electrical connection region.

FIG. 7 shows a high-level flowchart of an example method for creating an optical system of a camera, according to some embodiments.

Figure 1:
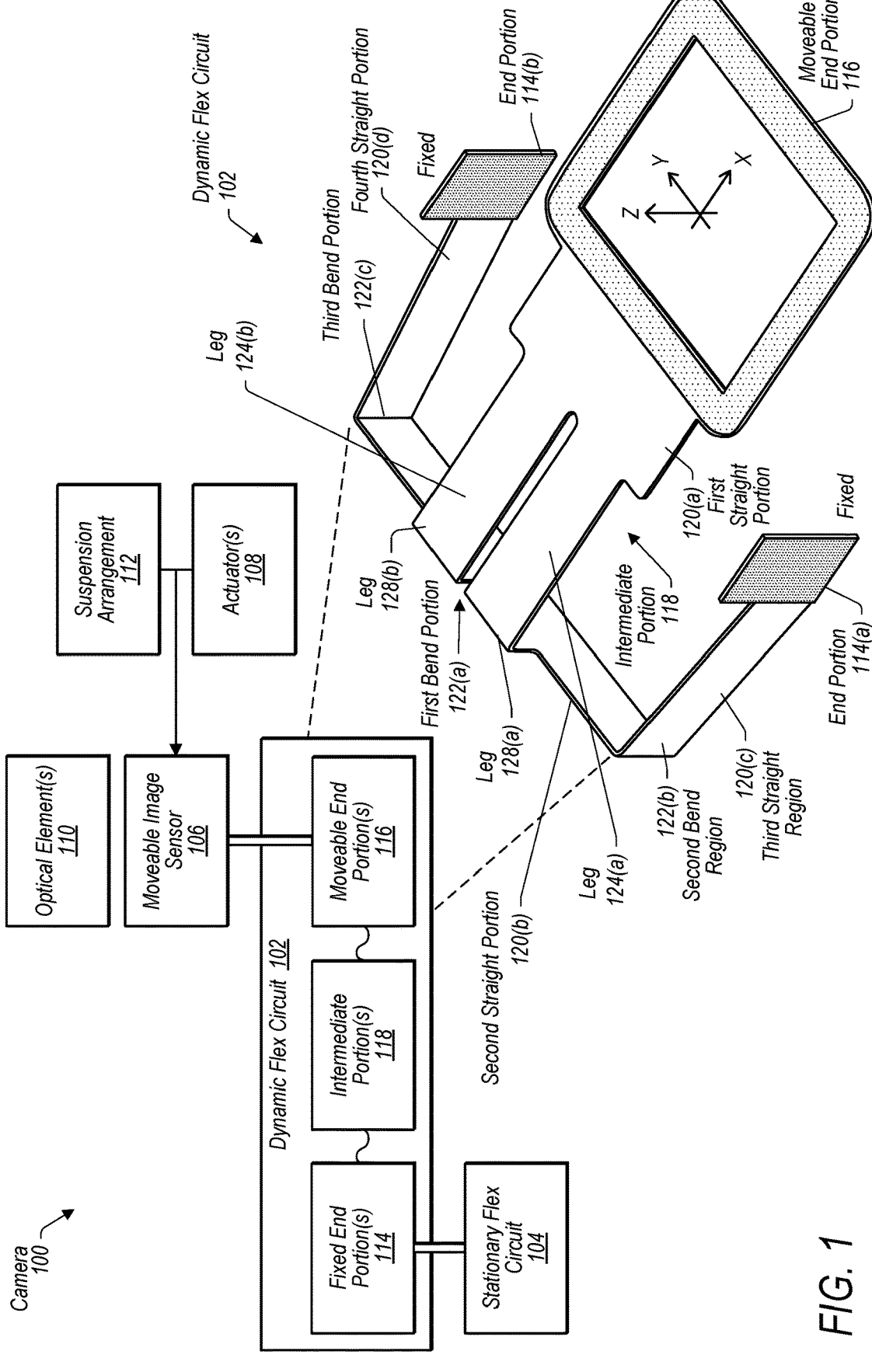
FIG. 1 illustrates a schematic block diagram of some components of an example camera with a moveable image sensor, and a perspective view of an example dynamic flex circuit that may be used with the moveable image sensor, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a flex circuit (also referred to herein as a "dynamic flex circuit") that may be used in a camera with a moveable image sensor. In some examples, the camera may include the dynamic flex circuit, a stationary flex circuit, a moveable image sensor, an actuator, and/or one or more optical elements. The image sensor may be configured to capture light that has passed through the optical element(s). The actuator may be configured to move the image sensor relative to the optical element(s), e.g., so as to provide autofocus (AF) and/or optical image stabilization (OIS) functionality. Additionally, or alternatively, the actuator may be configured to move one or more of the optical element(s) relative to the image sensor, e.g., so as to provide AF and/or OIS functionality. In some non-limiting examples, the actuator may be configured to move the image sensor orthogonal to a plane defined by the image sensor. Additionally, or alternatively, the actuator may be configured to move the image sensor parallel to the plane defined by the image sensor.

In various embodiments, the dynamic flex circuit may include one or more fixed end portions, a moveable end portion, and an intermediate portion. The fixed end portions may be connected to the stationary flex circuit. The moveable end portion may be coupled with the image sensor such that the moveable end portion moves with (e.g., in lockstep with) the image sensor. The intermediate portion may extend from each of the fixed end portions to the moveable end portion. The intermediate portion may be configured to allow the moveable end portion to move (e.g., with the image sensor) relative to the fixed end portions. In some embodiments, the dynamic flex circuit may be configured to convey electrical signals (e.g., power and/or control signals) along at least a portion of an electrical connection path between the stationary flex circuit and the moveable image sensor. As will be discussed herein with reference to FIGS. 1-9, the intermediate portion of the dynamic flex circuit may include one or more flex regions and one or more bent regions.

In some embodiments, the dynamic flex circuit may be subjected to signal integrity limitation with a single layer structure for reducing mechanical stiffness. In some aspects, a flex circuit may increase the number of conductive layers (e.g., Copper (Cu) layers) to improve the high speed signal integrity. However, with increased layers for the flex circuit, the stiffness of the flex circuit also increases. For example, when two conductive layers are adopted in a flex circuit architecture, the flex circuit stiffness may increase 3 to 10 times compared to a flex circuit with a single layer. Stiffness is strongly correlated with conductive layer thickness and reducing conductive layer thickness (e.g., a minimum of about 6.5 μm) may be useful during manufacturing. Thus, to control the stiffness of the flex circuit for magnetic force requirements while also improving high speed signal integrity, the flex circuit may also include two or more flexure arms etched out along the flex regions of the flex circuit to control stiffness of the flex circuit for magnetic force requirements. In some instances, a flex circuit may include two conductive layers on a thinner material substrate (e.g., about 30 μm) that is etch out to form two or more flexure arms to reduce mechanical stiffness caused by the two conductive layers. In some aspects, bent regions and the electrical connection region of the flex circuit may include an at least partially etched-out base substrate. The bent regions may also include a stiffener to maintain a bend angle.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

As mentioned above, various embodiments include a dynamic flex circuit for a camera with a moveable image sensor. FIG. 1 shows a schematic block diagram of some components a camera 100 including an example of such a dynamic flex circuit 102. Furthermore, FIG. 1 shows a perspective view of the dynamic flex circuit 102. The example X-Y-Z coordinate system shown in FIG. 1 is used to discuss aspects of components and/or systems, and may apply to embodiments described throughout this disclosure.

According to various embodiments, the camera 100 may include the dynamic flex circuit 102, a stationary flex circuit 104 (e.g., a flex circuit of a module of the camera 100), a moveable image sensor 106, one or more actuators 108, one or more optical elements 110, and/or a suspension arrangement 112. The image sensor 106 may be configured to capture light that has passed through the optical element(s) 110. The actuator(s) 108 may be configured to move the image sensor 106 relative to the optical element(s) 110, e.g., to provide AF and/or OIS functionality. Additionally, or alternatively, the actuator(s) 108 may be configured to move one or more of the optical element(s) 110 relative to the image sensor 106, e.g., to provide AF and/or OIS functionality. In some non-limiting examples, the actuator(s) 108 may be configured to move the image sensor 106 orthogonal to a plane defined by the image sensor 106 (e.g., movement in the Z-axis direction). Additionally, or alternatively, the actuator(s) 108 may be configured to move the image sensor 106 parallel to the plane defined by the image sensor 106 (e.g., movement in the X-Y plane directions).

In various embodiments, the dynamic flex circuit 102 may include one or more fixed end portions 114, one or more moveable end portions 116, and/or one or more intermediate portions 118. As indicated in the perspective view of the dynamic flex circuit 102 in FIG. 1, in some non-limiting examples the dynamic flex circuit 102 may include fixed end portions 114(*a*) and 114(*b*), a moveable end portion 116, and an intermediate portion 118. The fixed end portions 114(*a*) and 114(*b*) may be connected to the stationary flex circuit 104. The moveable end portion 116 may be coupled with the image sensor 106 such that the moveable end portion 116 moves with (e.g., in lockstep with) the image sensor 106. The intermediate portion 118 may extend from each of the fixed end portions 114(*a*) and 114(*b*) to the moveable end portion 116. The intermediate portion 118 may be configured to allow the moveable end portion 116 to move (e.g., with the image sensor 106) relative to the fixed end portions 114(*a*) and 114(*b*). In some embodiments, the dynamic flex circuit 102 may be configured to convey electrical signals (e.g., power and/or control signals) along at least a portion of an electrical connection path between the stationary flex circuit 104 and the moveable image sensor 106.

In some embodiments, the fixed end portions 114(*a*) and 114(*b*) of the dynamic flex circuit 102 may be fixedly attached to the stationary flex circuit 104 (which may be considered a stationary structure) and/or fixedly attached to another stationary structure (e.g., stationary structure 208 in FIG. 2) of the camera 100. For example, the fixed end portions 114(*a*) and 114(*b*) may be attached to one or more stationary structures, and an electrical connection may be provided between the fixed end portions 114(*a*) and 114(*b*) and the stationary flex circuit 104 via the stationary structure(s). In some embodiments, each of the fixed end portions 114(*a*) and 114(*b*) may have a first side that is attached to the stationary flex circuit 104 and a second side (e.g., opposite the first side) that is attached to another stationary structure.

According to some embodiments, fixed end portion 114(*a*) and/or fixed end portion 114(*b*) of the dynamic flex circuit 102 may comprise a respective electrical connection pad (e.g., an exposed copper pad) that may be electrically connected (e.g., via hot-bar soldering) to a corresponding electrical connection component of the stationary flex circuit 104. In some embodiments, fixed end portion 114(*a*) and/or fixed end portion 114(*b*) may define a respective plane that is orthogonal to a respective plane defined by the moveable end portion 116 and/or the image sensor 106, e.g., as indicated in FIG. 1. However, it is contemplated that, in some embodiments, fixed end portion 114(*a*) and/or fixed end portion 114(*b*) may define a respective plane that is oriented differently (e.g., parallel to) relative to a respective plane defined by the moveable end portion 116 and/or the image sensor 106.

In various embodiments, the moveable end portion 116 of the dynamic flex circuit 102 may be coupled with the image sensor 106. For example, the image sensor 106 may be attached to (or otherwise coupled with) a substrate (e.g., substrate 206 in FIG. 2) of the camera 100, and the moveable end portion 116 may be attached to the substrate. In some embodiments, the moveable end portion 116 may be electrically connected to the image sensor 106 via the substrate and/or one or more other intervening components.

According to various embodiments, the intermediate portion 118 of the dynamic flex circuit 102 may extend from the moveable end portion 116 to each of the fixed end portions 114(*a*) and 114(*b*). The intermediate portion 118 may include one or more flex regions and/or one or more bent regions. As indicated in FIG. 1, in some non-limiting examples, the intermediate portion 118 may include a first flex region 120(*a*), a second flex region 120(*b*), a third flex region 120(*c*), and/or a fourth flex region 120(*d*). Furthermore, the intermediate portion 118 may include a first bent region 122(*a*), a second bent region 122(*b*), and/or a third bent region 122(*c*). The first bent region 122(*a*) may interconnect the first flex region 120(*a*) with the second flex region 120(*b*). The second bent region 122(*b*) may interconnect the second flex region 120(*b*) with the third flex region 120(*c*). The third bent region 122(*c*) may interconnect the second flex region 120(*b*) with the fourth flex region 120(*c*). According to some examples, a pair of adjacent flex regions (e.g., the first flex region 120(*a*) and the second flex region 120(*b*)) may be positioned at a respective non-zero bend angle (e.g., 90 degrees) with respect to each other so as to comprise a bend via a bent region (e.g., the first bent region 122(*a*)). In various embodiments, the bend angle may change slightly as the image sensor 106 is moved, but the bend may be present through the entire potential range of motion of the image sensor 106. In some non-limiting examples, the bend angle may be within a range of 45 degrees to 135 degrees. In some other non-limiting examples, the bend angle may be within a range of 60 degrees and 120 degrees.

In some embodiments, the first flex region 120(*a*) may define a plane that is parallel to the X-Y plane, and may have a longest dimension extending in the X-axis direction from the moveable end portion 116 to the first bent region 122(*a*). The second flex region 120(*b*) may define a plane that is parallel to the Y-Z plane, and may have a longest dimension extending in the Y-axis direction from the second bent region 122(*b*) to the third bent region 122(*c*). The third flex region 120(*c*) may define a plane that is parallel to the X-Z plane, and may have a longest dimension extending in the X-axis direction from the second bent region 122(*b*) to fixed end portion 114(*a*). The fourth flex region 120(*d*) may define a plane that is parallel to the X-Z plane, and may have a longest dimension extending in the X-axis direction from the third bent region 122(*c*) to fixed end portion 114(*b*). As indicated in FIG. 1, the dynamic flex circuit 102 may be symmetrical (e.g., about a plane that is parallel to the X-Z plane). However, the dynamic flex circuit 102 may be asymmetrical about one or more planes that are parallel to the X-Z plane, the Y-Z plane, and/or X-Z plane.

According to some embodiments, the longest dimension of the first flex region 120(*a*) may be sized so as to reduce stiffness of the dynamic flex circuit 102 in the Z-axis direction, e.g., to allow movement of the moveable end portion 116 in the Z-axis direction. The longest dimension of the second flex region 120(*b*) may be sized so as to reduce stiffness of the dynamic flex circuit 102 in the X-axis direction, e.g., to allow movement of the moveable end portion 116 in the X-axis direction. The longest dimension of the third flex region 120(*c*) may be sized so as to reduce stiffness of the dynamic flex circuit 102 in the Y-axis direction, e.g., to allow movement of the moveable end portion 116 in the Y-axis direction. Similarly, the longest dimension of the fourth flex region 120(*d*) may be sized so as to reduce stiffness of the dynamic flex circuit 102 in the Y-axis direction, e.g., to allow movement of the moveable end portion 116 in the Y-axis direction.

In some embodiments, the first bent region 122(*a*) may be a region at which the dynamic flex circuit 102 bends about a first axis. The second bent region 122(*b*) may be a region at which the dynamic flex circuit 102 bends about a second axis. The third bent region 122(*c*) may be a region at which the dynamic flex circuit 102 bends about a third axis. In some embodiments, one or more of the axes may intersect one or more of the other axes. In some non-limiting examples, the first axis (corresponding to the first bent region 122(a)) may intersect the second axis (corresponding to the second bent region 122(b)) and/or the third axis (corresponding to the third bent region 122(c)). In some non-limiting examples, the first axis may be orthogonal to each of the second axis and the third axis. Furthermore, in some embodiments, one or more of the axes may be parallel to one or more of the other axes. In some non-limiting examples, the second axis may be parallel to the third axis. According to some non-limiting examples, the first axis may be parallel to the Y-axis (and/or parallel to a respective plane defined by the moveable end portion 116 and/or the image sensor 106), the second axis may be parallel to the Z-axis (and/or orthogonal to the respective plane defined by the moveable end portion 116 and/or the image sensor 106), and/or the third axis may be parallel to the Z-axis (and/or orthogonal to the respective plane defined by the moveable end portion 116 and/or the image sensor 106).

In some embodiments, one or more of the flex regions and/or the bent regions of the dynamic flex circuit 102 may split, at least in part, into multiple "legs." As a non-limiting example, a portion of the first flex region 120(a) may split into two legs 124(a) and 124(b) that extend in parallel from a wider portion 126 of the first flex region 120(a) to the first bent region 122(a), e.g., as indicated in FIG. 1. In some examples, the first bent region 122(a) may split into two corresponding legs 128(a) and 128(b) that connect with legs 124(a) and 124(b), respectively. In some embodiments, the wider portion 126 of the first flex region 120(a) may provide a fan-out space for electrical signal traces (not shown) routed from the moveable end portion 116 to fixed end portion 114(a) and/or fixed end portion 114(b). For example, one or more electrical signal traces may be routed along the following path: from the moveable end portion 116 to the wider portion 126 of the first flex region 120(a), from the wider portion 126 to leg 124(a) of the first flex region 120(a), from leg 124(a) to corresponding leg 128(a) of the first bent region 122(a), from corresponding leg 128(a) to second flex region 120(b) in a first direction to the second bent region 122(b) (e.g., through a segment of the second flex region 120(b) that extends from its connection to the first bent region 122(a) to its connection to the second bent region 122(b)), from the second bent region 122(b) to fixed end portion 114(a). Additionally, or alternatively, one or more electrical signal traces may be routed along the following path: from the moveable end portion 116 to the wider portion 126 of the first flex region 120(a), from the wider portion 126 to leg 124(b) of the first flex region 120(a), from leg 124(b) to corresponding leg 128(b) of the first bent region 122(a), from corresponding leg 128(b) to second flex region 120(b) in a second direction (e.g., opposite the first direction) to the third bent region 122(c) (e.g., through another segment of the second flex region 120(b) that extends from its connection to the first bent region 122(a) to its connection to the third bent region 122(c)), and from the third bent region 122(c) to fixed end portion 114(b).

In some embodiments, the number, type(s), size(s), and/or arrangement of electrical signal traces that are routed via leg 124(a) may be the same as, or may differ from, those routed via leg 124(b). In various non-limiting examples, electrical signal traces and/or dummy traces (e.g., elements that do not actually convey electrical signals) may be distributed between the legs 124(a) and 124(b) such that symmetry of weight is maintained, e.g., about a plane defining symmetry of geometry of the dynamic flex circuit 102.

According to some embodiments, a portion of the wider portion 126 may be used to provide a surface area for attachment of the moveable end portion 116 to one or more components (e.g., to the substrate via an adhesive), e.g., to couple the dynamic flex circuit 102 with the image sensor 106. Additionally, or alternatively, the moveable end portion 116 may provide surface area for the same (or similar) attachment. In some non-limiting examples, the moveable end portion 116 may loop around a periphery edge portion of the substrate and/or another component that is coupled with the image sensor 106.

As discussed above, the camera 100 may include actuator(s) 108 and/or a suspension arrangement 112. In some non-limiting examples, the actuator(s) may comprise a voice coil motor (VCM) actuator. The VCM actuator may include one or more magnets and one or more coils. The magnet(s) and coil(s) may magnetically interact to produce Lorentz forces that move the image sensor 106, e.g., to provide AF and/or OIS functionality. However, the actuator(s) 108 may include any other actuator suitable for moving the image sensor 106. In various embodiments, the suspension arrangement 112 may be configured to suspend the image sensor 106 from one or more stationary structures (e.g., base structure 210 in FIG. 2). Furthermore, the suspension arrangement 112 may be configured to allow movement of the image sensor 106, e.g., in accordance with movement caused by the actuator(s) 108. In some non-limiting examples, the suspension arrangement 112 may include one or more flexures (e.g., leaf spring(s), suspension wire(s), flexure arm(s), etc.) and/or bearings (e.g., ball bearings), etc.

According to some embodiments, the optical element(s) 110 may include a lens group. For example, the lens group may include one or more lens elements that define an optical axis. In some embodiments, the optical element(s) 100 may additionally, or alternatively, include one or more light-folding elements (e.g., a prism, a mirror, etc.) configured to fold a path of light before the light reaches the image sensor 106. As such, the camera 100 may be considered to have a folded optics arrangement that folds a path of light one or more instances before reaching the image sensor 106. In some embodiments, a folded optics arrangement may provide spaces at certain locations that enable space-efficient inclusion of the dynamic flex circuit 102. As a non-limiting example, at least part of the intermediate portion 118 may be disposed within a space below a light-folding element and/or below a lens group without increasing the Z-axis dimension of the camera 100. In some embodiments, the camera 100 may not include light-folding elements.

As discussed above, in some examples, the actuator(s) 108 may be configured to move one or more of the optical element(s) 110 relative to the image sensor 106. Furthermore, the actuator(s) 108 may be configured to move the image sensor 106 relative to the optical element(s) 110. In a non-limiting example, the optical element(s) 110 may include a lens group and one or more light-folding elements. The actuator(s) 108 may be configured to move the lens group and/or the light-folding element(s) relative to the image sensor 106, e.g., so as to provide AF functionality. Furthermore, the actuator(s) 108 may be configured to move the image sensor 106 relative to the optical element(s) 110, e.g., so as to provide OIS functionality. According to some non-limiting examples, the number of bent regions and/or flex regions of the dynamic flex circuit 102 may be reduced in embodiments where the number of movement axes of the image sensor 106 is reduced, e.g., by having the actuator(s) 108 move one or more of the optical element(s) 110 relative to the image sensor 106 for AF and/or OIS in addition to having the actuator(s) 108 move the image sensor 106 for AF and/or OIS.

Figure 2:
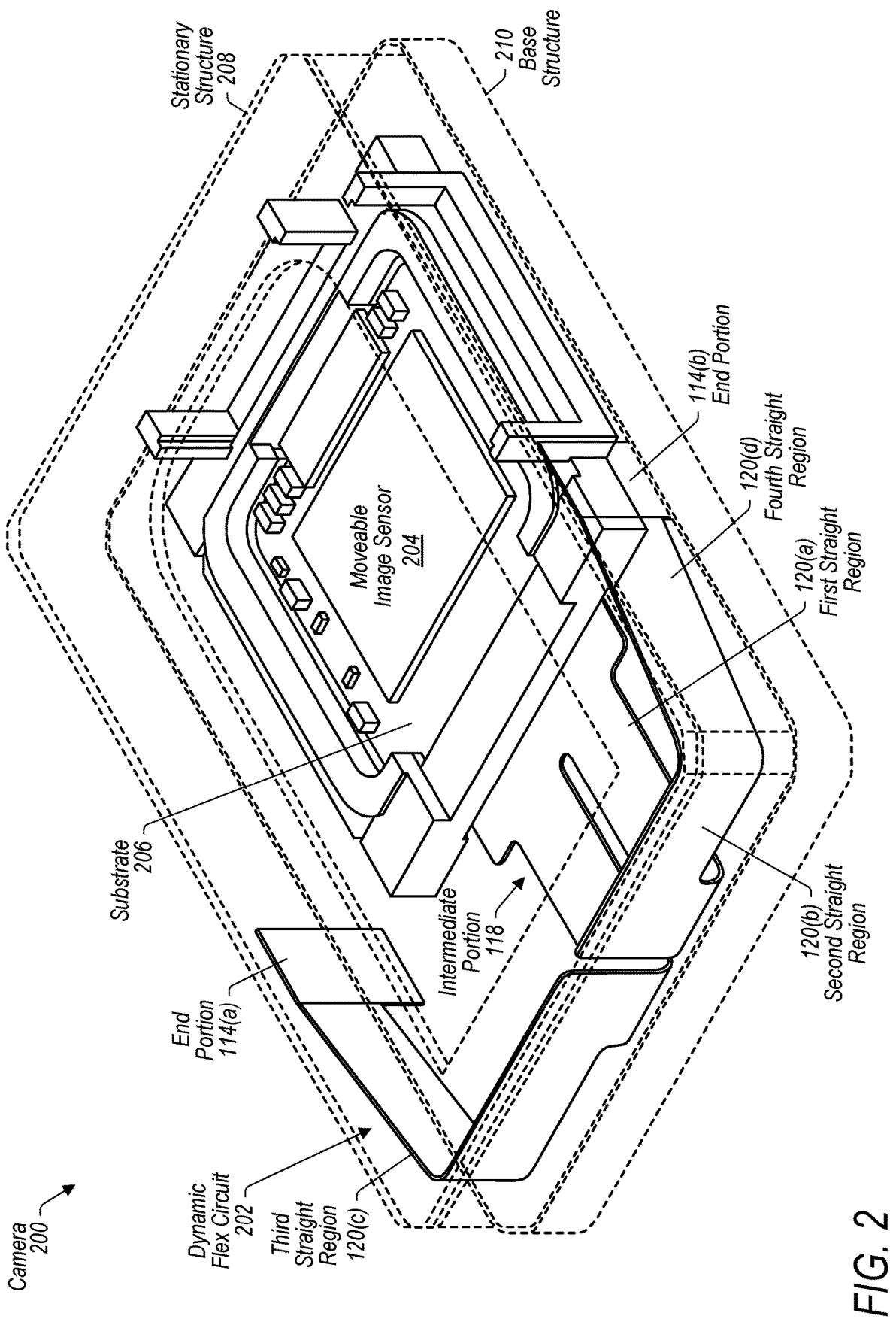
FIG. 2 illustrates a perspective view of portions of an example camera that includes a dynamic flex circuit that may be used with a moveable image sensor, in accordance with some embodiments.

FIG. 2 illustrates a perspective view of portions of an example camera 200 that includes a dynamic flex circuit 202 that may be used with a moveable image sensor 204. In some embodiments, aspects of the camera 200 may be the same as (or similar to) aspects of the camera 100 described herein with reference to FIG. 1. In some embodiments, aspects of the dynamic flex circuit 202 may be the same as (or similar to) aspects of one or more of the dynamic flex circuits described herein with reference to FIGS. 1 and 3-6. For simplicity of discussion, the terms used to describe portions of the dynamic flex circuit 100 of FIG. 1 will be used herein to reference portions of the dynamic flex circuit 200 of FIG. 2.

According to some embodiments, the camera 200 may include the dynamic flex circuit 202, an image sensor 204, a substrate 206, and one or more stationary structures (e.g., stationary structure 208, base structure 210, etc.). The image sensor 204 may be attached to the substrate 206 and/or one or more other components, such as a moveable platform of a suspension arrangement of the camera 200.

In some embodiments, the dynamic flex circuit 202 may include the fixed end portions 114(a) and 114(b), the intermediate portion 118, and the moveable end portion 116 (obstructed from the reader's view by other components in FIG. 2). The fixed end portions 114(a) and 114(b) may be attached to the stationary structure 208. In some embodiments, the stationary structure 208 may comprise the stationary flex circuit 104 described herein with reference to FIG. 1. Additionally, or alternatively, the stationary structure 208 may provide an electrical connection between the stationary flex circuit 104 and each of the fixed end portions 114(a) and 114(b) of the dynamic flex circuit 202. In some embodiments, the moveable end portion 116 may be attached to the substrate 206 and/or otherwise coupled with the image sensor 204. As a non-limiting example, the moveable end portion 116 may be attached to a first side of the substrate 206, and the image sensor 204 may be attached to a second side (e.g., opposite the first side) of the substrate 206.

According to some embodiments, one or more portions of the dynamic flex circuit 202 may extend along (and/or proximate to) one or more respective sides of the camera 200, e.g., for the efficient use of space. For example, as indicated in FIG. 2, the moveable end portion 116 and the first flex portion 120(a) may extend along a first side (e.g., an upper or lower side) of the camera 200, the second flex portion 120(b) may extend along a second side of the camera 200, the third flex portion 120(c) may extend along a third side of the camera 200, and the fourth flex portion 120(d) may extend along a fourth side (e.g., opposite the third side) of the camera 200. The first side may be orthogonal to the second side, the third side, and/or the fourth side.

FIG. 3 illustrates a perspective views of an example dynamic flex circuit for a camera with a moveable image sensor, in accordance with some embodiments. In some embodiments, aspects of the dynamic flex circuit 300 may be the same as (or similar to) aspects of one or more of the dynamic flex circuits described herein with reference to FIGS. 1, 2, and 4-6. According to various embodiments, the dynamic flex circuit 300 may include one or more flex regions including a first flex region 302, a second flex region 304, a third flex region 306, and a fourth flex region 308. The dynamic flex circuit 300 may also include a plurality of bent regions adjacent flex regions and including a first bent region 310, a second bent region 312, and a third bent region 320. The dynamic flex circuit 300 may further include a first fixed end portion 314(a) and a second fixed end portion 314(b). The second fixed end portion 314(b) may be adjacent the electrical connection region 338. The electrical connection region 338 may be connecting the dynamic flex circuit 300 to one or more other electrical components of, for example, a camera. In some aspects, the electrical connection region 338 may be anisotropic conductive film (ACF) region. In addition, the dynamic flex circuit 300 may include an intermediate portion 318 adjacent the third bent region 320 and the moveable end portion 316.

As described herein, the flex regions and the bent regions may include multiple conductive layers (e.g., Cu layers) for increased signal integrity (e.g., increased high-speed signal integrity). However, due to the multiple conductive layers, the flex regions and bent regions may have increased stiffness impeding the dynamic flex circuit's ability to flex in accordance with magnetic forces. Thus, each of the first flex region 302, the second flex region 304, the third flex region 306, the fourth flex region 308, and the intermediate portion 318 may including a plurality of flexure arms to reduce stiffness of the dynamic flex circuit 300 while still providing increased signal integrity due to the multiple conductive layers. The flexure arms may be etched out of the material forming the flex regions. For example, the first flex region 302 may include a first set of two or more flexure arms 326. The second flex region 304 may include a second set of two or more flexure arms 328. The third flex region 306 may include a third set of two or more flexure arms 330. The fourth flex region 308 may include a fourth set of two or more flexure arms 332. The intermediate portion 318 may include a fifth set of two or more flexure arms 334.

Figure 5:
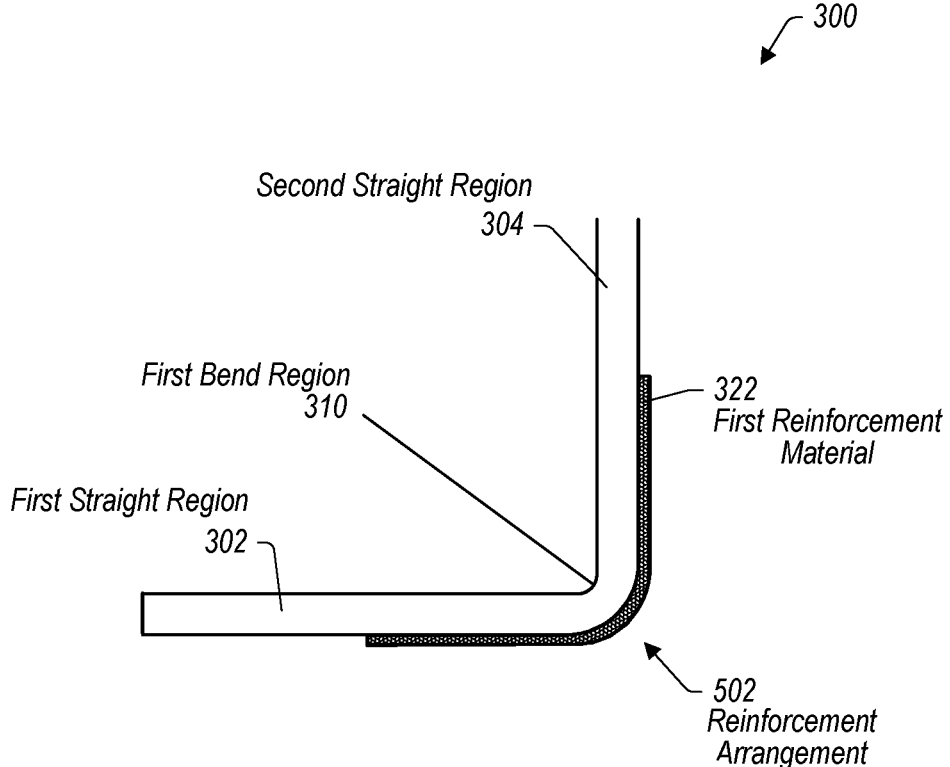
FIG. 5 illustrates a side view of an example reinforcement layer that may be used in a reinforcement arrangement for reinforcing one or more portions of a dynamic flex circuit in a camera with a moveable image sensor, in accordance with some embodiments.

In some aspects, bent regions and the electrical connection region of the dynamic flex circuit 300 may include an at least partially etched-out base substrate. For example, each of the first bent region 310, the second bent region 312, the third bent region 320, and the electrical connection region 338 may be at least partially etched-out through the base substrate to reduce stiffness. The bent regions may also each include stiffeners or reinforcement material (e.g., PI, aluminum, stainless steel, etc.) to maintain a bend angle. For example, as shown in FIGS. 3, 4B, and 5, the first bent region 310 may include a first reinforcement material 322 to maintain the bend angle of the first bent region 310. As another example, the second bent region 312 may include a second reinforcement material 324 to maintain the bend angle of the second bent region 312. As yet another example, the third bent region 320 may include a third reinforcement material 336 to maintain the bend angle of the third bent region 320. Due to the reinforcement material the bent regions may be thicker than the flex regions. In some instances, the reinforcement material may be attached to the bent regions using an adhesive. The stiffeners or reinforcement materials may provide the bent regions with additional stiffness so that the bent regions are stiffer than the flex regions. The stiffeners or reinforcement materials may also provide the bent regions with additional stiffness to reduce flexing of the bent regions for at least partially mitigating damage to stress areas due to bending of the bent regions during manufacturing.

According to various embodiments, the dynamic flex circuit 300 may comprise one or more flex circuit materials. As a non-limiting example, the dynamic flex circuit 300 may comprise composite layers of polyimide (PI), adhesive, and copper. In some embodiments, the flex and bent regions may include a contiguous strip of at least one of the flex circuit materials. While the dynamic flex circuit 300 is illustrated with respect to the flex regions and the bent regions as shown in FIG. 3, it should be understood that various combinations the flex regions and the bent regions may be used with respect to dynamic flex circuit 300.

FIGS. 4A, 4B, and 4C illustrate a cross-sectional views of example regions of a dynamic flex circuit for a camera with a moveable image sensor, in accordance with some embodiments. FIG. 4A illustrates an example of the dynamic flex circuit 300 at a flex region 302. FIG. 4B illustrates an example of the dynamic flex circuit 300 at a bent region 310. It should be understood that while FIG. 4B illustrates the bent region 310 in a flat (or non-bent state), the bent region 310 is bent during manufacturing of the dynamic flex circuit 300, for example, to provide the ben region 310 as shown in FIG. 3. FIG. 4C illustrates an example of the dynamic flex circuit 300 at an electrical connection region 338. In some embodiments, aspects of the dynamic flex circuit 300 may be the same as (or similar to) aspects of one or more of the dynamic flex circuits described herein with reference to FIGS. 1-3, 5, and 6. For simplicity of discussion, the terms used to describe portions of the dynamic flex circuit 100 of FIG. 1 will be used herein to reference portions of the dynamic flex circuit 300 of FIGS. 4A, 4B, and 4C.

As shown in FIG. 4A, the first flex region 302 may include a plurality of layers including a cover layer 402, a first conductive layer 404 (e.g., a routing layer), an insulating layer 406, a second conductive layer 408 (e.g., a ground layer), and a base substrate 410. The first conductive layer 404 and the second conductive layer 408 may provide the increase signal integrity for the dynamic flex circuit 300 described herein. As shown in FIG. 4B, the first bent region 310 may include a plurality of layers including the cover layer 402, the first conductive layer 404, the insulating layer 406, the second conductive layer 408, and the base substrate 410. The first bent region 310 may also include a removed region 412. The removed region 412 may include a removed portion of the base substrate 410 to reduce stiffness and to allow for bending of the first bent region 310. In addition, the first bent region 310 may also include a first reinforcement material 322, as described herein. As shown in FIG. 4C, the electrical connection region 338 may include a plurality of layers including the cover layer 402, the first conductive layer 404, the insulating layer 406, and the second conductive layer 408. In some aspects, the electrical connection region 338 may not include the base substrate 410.

Figure 6:
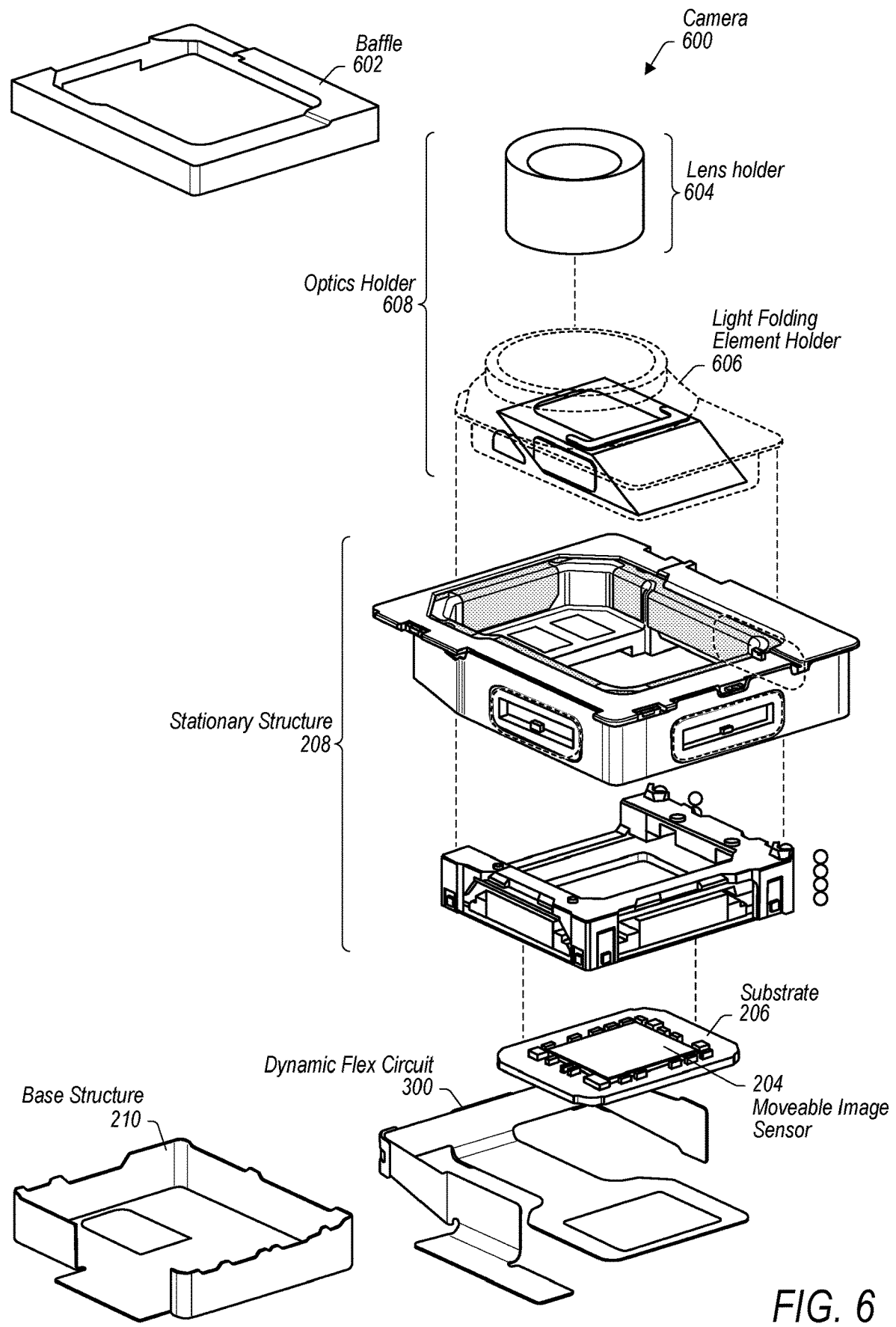
FIG. 6 illustrate an exploded view of an example camera including a dynamic flex circuit that may be used with a moveable image sensor, in accordance with some embodiments.

FIG. 6 illustrate an exploded view of an example camera 600 including a dynamic flex circuit 300 that may be used with a moveable image sensor 204, in accordance with some embodiments. As shown in FIG. 6, the camera 600 may include a baffle 602, an optics holder 604, the stationary structure 208, the substrate 206, the moveable image sensor 204, the dynamic flex circuit 300, and the base structure 210. The optics holder may include a lens holder 604 having one or more lens and a light flowing element holder 606.

FIG. 7 shows a high-level flowchart of an example method for creating an optical system of a camera, according to some embodiments. As shown in FIG. 7, the method 700 may include, as indicated by block 702, forming a plurality of layers of a flex circuit (as shown in FIGS. 4A, 4B, and 4C) to convey electrical signals between an image sensor and a stationary structure of a camera (as shown in FIGS. 1, 2, and 6). The flex circuit may include a first flex region, a second flex region, a bent region extending from the first flex region to the second flex region (as shown in FIG. 3). The flex circuit may be configured such that motion of an image sensor causes the first flex region to move relative to the second flex region. The plurality of layers may include a first conductive layer for routing the electrical signals, a second conductive layer, an insulation layer positioned between the first conductive layer and the second conductive layer (as shown in FIGS. 4A, 4B, and 4C). In some aspects, the plurality of layers may also include a base substrate positioned adjacent the second conductive layer and opposite the insulating layer (as shown in FIGS. 4A and 4B).

The method 700 may also include, as indicated by block 704, removing, using one or more subtractive manufacturing processes, one or more portions of the first flex region and/or the second flex region to form two or more flexure arms extending along the first flex region and/or the second flex region for enabling the movement of the first flex region relative to the second flex region in accordance with a stiffness (as shown in FIG. 3). In some aspects, the two or more flexure arms comprise a determined quantity of flexure arms to enable the movement of the first flex region relative to the second flex region in accordance with the stiffness. In some aspects, removing the one or more portion of the first flex region and/or the second flex region may include removing one or more portions of the first conductive layer, the second conductive layer, and the insulation layer. Additionally, removing the one or more portion of the first flex region and/or the second flex region may include removing one or more portions of the base substrate. The method 700 may further include, as indicated by block 706, removing, using one or more subtractive manufacturing processes, at least some of the base substrate at the bent region of the flex circuit (as shown in FIG. 4B). The base substrate may be removed at the bent region to accommodate a turn of the flex circuit at the bent region. In some aspects, the method 700 may include adding a reinforcement material at the bent region to maintain an angle of the bent region.

Figure 8:
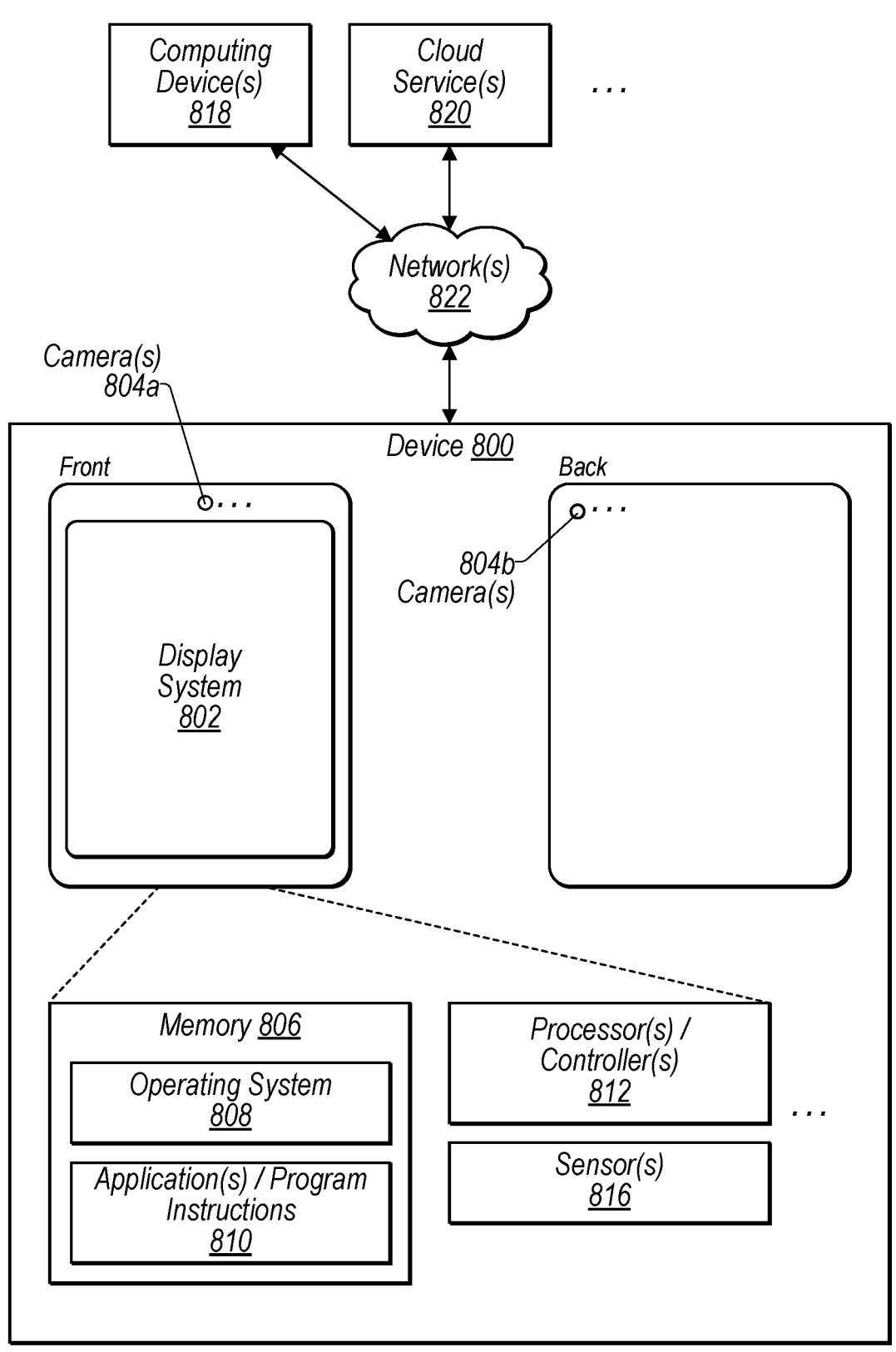
FIG. 8 illustrates a schematic representation of an example device 800 that may include a camera, in accordance with some embodiments.

FIG. 8 illustrates a schematic representation of an example device 800 that may include a camera (e.g., the camera described above in FIGS. 1-7 and 9), in accordance with some embodiments. In some embodiments, the device 800 may be a mobile device and/or a multifunction device. In various embodiments, the device 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 800 may include a display system 802 (e.g., comprising a display and/or a touch-sensitive surface) and/or one or more cameras 804. In some non-limiting embodiments, the display system 802 and/or one or more front-facing cameras 804a may be provided at a front side of the device 800, e.g., as indicated in FIG. 8. Additionally, or alternatively, one or more rear-facing cameras 804b may be provided at a rear side of the device 800. In some embodiments comprising multiple cameras 804, some or all of the cameras may be the same as, or similar to, each other. Additionally, or alternatively, some or all of the cameras may be different from each other. In various embodiments, the location(s) and/or arrangement(s) of the camera(s) 804 may be different than those indicated in FIG. 8.

Among other things, the device 800 may include memory 806 (e.g., comprising an operating system 808 and/or application(s)/program instructions 810), one or more processors and/or controllers 812 (e.g., comprising CPU(s), memory controller(s), display controller(s), and/or camera controller(s), etc.), and/or one or more sensors 816 (e.g., orientation sensor(s), proximity sensor(s), and/or position sensor(s), etc.). In some embodiments, the device 800 may communicate with one or more other devices and/or services, such as computing device(s) 818, cloud service(s) 820, etc., via one or more networks 822. For example, the device 800 may include a network interface (e.g., network interface 810) that enables the device 800 to transmit data to, and receive data from, the network(s) 822. Additionally, or alternatively, the device 800 may be capable of communicating with other devices via wireless communication using any of a variety of communications standards, protocols, and/or technologies.

Figure 9:
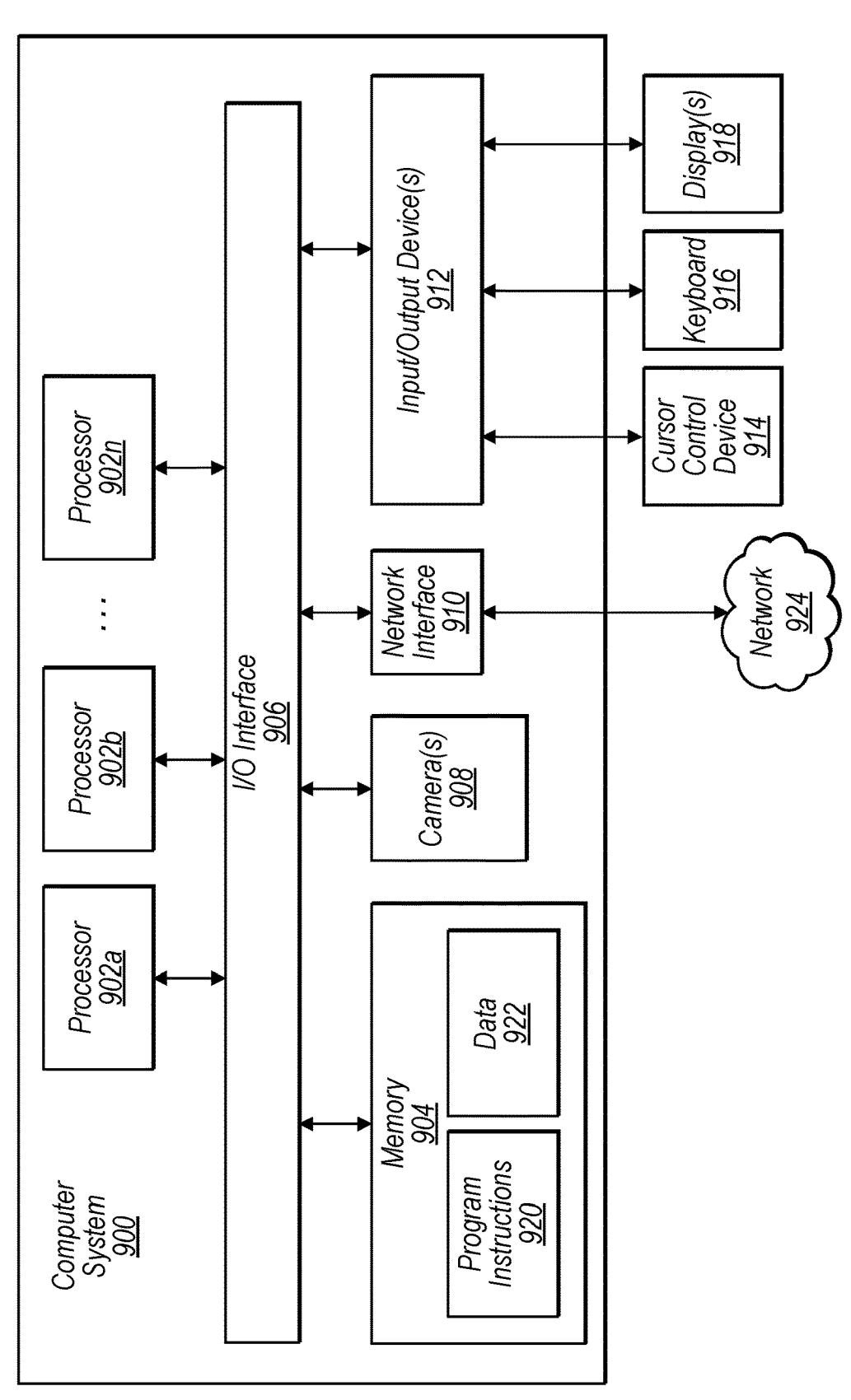
FIG. 9 illustrates a schematic block diagram of an example computing device, referred to as computer system, that may include or host embodiments of a camera, in accordance with some embodiments.

FIG. 9 illustrates a schematic block diagram of an example computing device, referred to as computer system 900, that may include or host embodiments of a camera, e.g., as described herein with reference to FIGS. 1-8. In addition, computer system 900 may implement methods for controlling operations of the camera and/or for performing image processing images captured with the camera. In some embodiments, the device 900 (described herein with reference to FIG. 9) may additionally, or alternatively, include some or all of the functional components of the computer system 900 described herein.

The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 900 includes one or more processors 902 coupled to a system memory 904 via an input/output (I/O) interface 906. Computer system 900 further includes one or more cameras 908 coupled to the I/O interface 906. Computer system 900 further includes a network interface 910 coupled to I/O interface 906, and one or more input/output devices 912, such as cursor control device 914, keyboard 916, and display(s) 918. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 902, or a multiprocessor system including several processors 902 (e.g., two, four, eight, or another suitable number). Processors 902 may be any suitable processor capable of executing instructions. For example, in various embodiments processors 902 may be general-purpose or embedded processors implementing any of a variety of instruction set architectures (ISAs), such as the x86, PowerPC, SPARC, or MIPS ISAs, or any other suitable ISA. In multiprocessor systems, each of processors 902 may commonly, but not necessarily, implement the same ISA.

System memory 904 may be configured to store program instructions 920 accessible by processor 902. In various embodiments, system memory 904 may be implemented using any suitable memory technology, such as static random access memory (SRAM), synchronous dynamic RAM (SDRAM), nonvolatile/Flash-type memory, or any other type of memory. Additionally, existing camera control data 922 of memory 904 may include any of the information or data structures described above. In some embodiments, program instructions 920 and/or data 922 may be received, sent or stored upon different types of computer-accessible media or on similar media separate from system memory 904 or computer system 900. In various embodiments, some or all of the functionality described herein may be implemented via such a computer system 900.

In one embodiment, I/O interface 906 may be configured to coordinate I/O traffic between processor 902, system memory 904, and any peripheral devices in the device, including network interface 910 or other peripheral interfaces, such as input/output devices 912. In some embodiments, I/O interface 906 may perform any necessary protocol, timing or other data transformations to convert data signals from one component (e.g., system memory 904) into a format suitable for use by another component (e.g., processor 902). In some embodiments, I/O interface 906 may include support for devices attached through various types of peripheral buses, such as a variant of the Peripheral Component Interconnect (PCI) bus standard or the Universal Serial Bus (USB) standard, for example. In some embodiments, the function of I/O interface 906 may be split into two or more separate components, such as a north bridge and a south bridge, for example. Also, in some embodiments some or all of the functionality of I/O interface 906, such as an interface to system memory 904, may be incorporated directly into processor 902.

Network interface 910 may be configured to allow data to be exchanged between computer system 900 and other devices attached to a network 924 (e.g., carrier or agent devices) or between nodes of computer system 900. Network 924 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 910 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 912 may, in some embodiments, include one or more display terminals, keyboards, keypads, touchpads, scanning devices, voice or optical recognition devices, or any other devices suitable for entering or accessing data by one or more computer systems 900. Multiple input/output devices 912 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 910.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
one or more optical elements;
an image sensor;
an actuator to move the image sensor relative to the one or more optical elements;
a flex circuit configured to convey electrical signals between the image sensor and a stationary structure of the camera, wherein the flex circuit comprises:
a first flex region,
a second flex region,
a bent region extending from the first flex region to the second flex region, wherein the flex circuit is configured such that motion of the image sensor enabled by the actuator causes the first flex region to move relative to the second flex region,
wherein at least one of the first flex region, the second flex region, or the bent region comprise a plurality of layers including:
a first conductive layer for routing the electrical signals,
a second conductive layer,
an insulation layer positioned between the first conductive layer and the second conductive layer, and
a base substrate positioned adjacent the second conductive layer and opposite the insulating layer, and
wherein at least one of the first flex region or the second flex region comprises two or more flexure arms extending along the respective flex region for enabling movement of the first flex region relative to the second flex region in accordance with a stiffness; and
wherein at least a portion of the base substrate is removed at the bent region to accommodate a turn of the flex circuit at the bent region.

2. The camera of claim 1, wherein the two or more flexure arms comprises at least three flexure arms to enable the movement of the first flex region relative to the second flex region in accordance with the stiffness.

3. The camera of claim 1, wherein the base substrate comprises at least one of a plastic material or metal alloy material.

4. The camera of claim 1, wherein the flex circuit further comprises:
a reinforcement material positioned at the bent region to maintain an angle of the bent region.

5. The camera of claim 4, wherein at least one of the first flex region or the second flex region comprises a lesser stiffness than the bent region.

6. The camera of claim 1, wherein the flex circuit further comprises:
a fixed end portion fixedly attached to the stationary structure;
a moveable end portion coupled with the image sensor such that the moveable end portion moves with the image sensor relative to the fixed end portion; and
an intermediate portion that allows the moveable end portion to move with the image sensor and that conveys electrical signals between the fixed end portion and the moveable end portion, wherein the intermediate portion comprises:
the first flex region;
the second flex region; and
the bent region.

7. The camera of claim 6, wherein:

the bent region is a first bent region;

the first flex region is a first contiguous leg of the flex circuit that extends, in a first direction parallel to an image plane defined by the image sensor, from the moveable end portion to the first bent region;

the second flex region is a second contiguous leg of the flex circuit that extends, in a second direction different than the first direction, from a second bent region of the flex circuit to a third bent region of the flex circuit; and the first bent region and the first flex region are centered, in the second direction, between the second bent region and the third bent region.

8. A device, comprising:

one or more processors;

memory storing program instructions executable by the one or more processors to control operation of a camera; and the camera, comprising:

one or more optical elements, an image sensor, an actuator to move the image sensor relative to the one or more optical elements, a flex circuit configured to convey electrical signals between the image sensor and a stationary structure of the camera, wherein the flex circuit comprises:

a first flex region, a second flex region, a bent region extending from the first flex region to the second flex region, wherein the bent region remains bent during operation of the camera, wherein the flex circuit is configured such that motion of the image sensor enabled by the actuator causes the first flex region to move relative to the second flex region, wherein at least the bent region of the flex circuit comprises a plurality of layers including:

a first conductive layer for routing the electrical signals, a second conductive layer, an insulation layer positioned between the first conductive layer and the second conductive layer, and a base substrate positioned adjacent the second conductive layer and opposite the insulating layer, wherein the base substrate comprises a metal alloy material, and wherein the first flex region or the second flex region comprises two or more flexure arms extending along the respective flex regions and the second flex region for enabling movement of the first flex region relative to the second flex region in accordance with a stiffness.

9. The device of claim 8, wherein at least a portion of the base substrate is etched at the bent region to accommodate a turn of the flex circuit at the bent region.

10. The device of claim 8, wherein the flex circuit further comprises:

a reinforcement material positioned at the bent region to maintain an angle of the bent region.

11. The device of claim 10, wherein at least one of the first flex region or the second flex region comprises a lesser stiffness than the bent region.

12. The device of claim 8, wherein the flex circuit further comprises:

a fixed end portion fixedly attached to the stationary structure;

a moveable end portion coupled with the image sensor such that the moveable end portion moves with the image sensor relative to the fixed end portion; and an intermediate portion that allows the moveable end portion to move with the image sensor and that conveys electrical signals between the fixed end portion and the moveable end portion, wherein the intermediate portion comprises:

the first flex region, the second flex region, and the bent region.

13. The device of claim 12, wherein:

the bent region is a first bent region;

the first flex region is a first contiguous leg of the flex circuit that extends, in a first direction parallel to an image plane defined by the image sensor, from the moveable end portion to the first bent region;

the second flex region is a second contiguous leg of the flex circuit that extends, in a second direction different than the first direction, from a second bent region of the flex circuit to a third bent region of the flex circuit; and the first bent region and the first flex region are centered, in the second direction, between the second bent region and the third bent region.

14. A method, comprising:

forming a plurality of layers that includes a flex circuit to convey electrical signals between an image sensor and a stationary structure of a camera, wherein the flex circuit comprises:

a first flex region, a second flex region, and a bent region extending from the first flex region to the second flex region, wherein the flex circuit is configured such that motion of the image sensor causes the first flex region to move relative to the second flex region, the plurality of layers including:

a first conductive layer for routing the electrical signals, a second conductive layer, and an insulation layer positioned between the first conductive layer and the second conductive layer, and a base substrate positioned adjacent the second conductive layer and opposite the insulating layer; and removing, using one or more subtractive manufacturing processes, one or more portions of at least one of the first flex region or the second flex region to form two or more flexure arms extending along the respective flex region for enabling movement of the first flex region relative to the second flex region in accordance with a stiffness, and at least a portion of the base substrate at the bent region to accommodate a turn of the flex circuit at the bent region.

* * * * *